(12) United States Patent
Griffin et al.

(10) Patent No.: US 7,825,900 B2
(45) Date of Patent: Nov. 2, 2010

(54) METHOD AND SYSTEM FOR SELECTING A CURRENCY SYMBOL FOR A HANDHELD ELECTRONIC DEVICE

(75) Inventors: Jason Griffin, Kitchener (CA); Vadim Fux, Waterloo (CA); Andrew Bocking, Waterloo (CA); Harry Major, Waterloo (CA); Ronald Scotte Zinn, Waterloo (CA); Sherryl Lee Lorraine Scott, Toronto (CA)

(73) Assignee: Research In Motion Limited, Waterloo (CA)

( * ) Notice: Subject to any disclaimer, the term of this patent is extended or adjusted under 35 U.S.C. 154(b) by 791 days.

(21) Appl. No.: 11/394,111

(22) Filed: Mar. 31, 2006

(65) Prior Publication Data

US 2007/0236461 A1 Oct. 11, 2007

(51) Int. Cl.
*G09G 5/00* (2006.01)
(52) U.S. Cl. .................... 345/169; 345/168; 345/172; 715/765; 715/773
(58) Field of Classification Search ......... 345/168–172, 345/773; 463/43; 715/202, 765, 773, 810, 715/835, 827, 864; 455/456.1; 341/22–34
See application file for complete search history.

(56) References Cited

U.S. PATENT DOCUMENTS

| | | | |
|---|---|---|---|
| 6,170,000 B1 * | 1/2001 | Bories et al. ................. 715/202 |
| 6,825,832 B2 * | 11/2004 | Chung et al. ................. 345/168 |
| 7,002,554 B2 * | 2/2006 | Numano et al. ............. 345/172 |
| 7,292,870 B2 * | 11/2007 | Heredia et al. .............. 455/466 |
| 7,432,990 B2 * | 10/2008 | Borden et al. ............... 348/734 |
| 2004/0183833 A1 * | 9/2004 | Chua .......................... 345/773 |
| 2004/0203909 A1 * | 10/2004 | Koster ..................... 455/456.1 |
| 2005/0019080 A1 * | 1/2005 | Pearson ..................... 400/490 |
| 2005/0026700 A1 * | 2/2005 | Blanco ......................... 463/43 |
| 2006/0001649 A1 * | 1/2006 | Rekimoto ................... 345/169 |
| 2006/0143578 A1 * | 6/2006 | Maktedar .................... 715/847 |
| 2007/0091072 A1 * | 4/2007 | Eun ............................ 345/169 |

* cited by examiner

*Primary Examiner*—Amare Mengistu
*Assistant Examiner*—Premal Patel
(74) *Attorney, Agent, or Firm*—Joseph Conneely; McCarthy Tetrault LLP

(57) ABSTRACT

A method for selecting a symbol for presentation on a display of a handheld electronic device, comprising: receiving a signal from a key on the handheld electronic device actuated by a user to select a default symbol, the default symbol being one of a plurality of symbols available through actuation of the key; if the actuation of the key is an initial actuation of the key, presenting the plurality of symbols on the display and receiving a signal to select the default symbol from among the plurality of symbols; and, presenting the default symbol on the display.

24 Claims, 8 Drawing Sheets

METHOD AND SYSTEM FOR SELECTING A CURRENCY SYMBOL FOR A HANDHELD ELECTRONIC DEVICE

FIELD OF THE APPLICATION

This application relates to the field of handheld electronic devices, and more specifically, to a method and system for enabling input on a handheld electronic device.

BACKGROUND

Numerous types of handheld electronic devices are known. Examples of such handheld electronic devices include, for instance, personal data assistants ("PDAs"), handheld computers, two-way pagers, cellular telephones, and the like. Many handheld electronic devices also feature wireless communication capability, although many such handheld electronic devices are stand-alone devices that are functional without communication with other devices.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable. In order to enable text entry, however, a keypad must be capable of entering all twenty-six letters of the Latin alphabet, for instance, as well as appropriate punctuation and other symbols.

One way of providing numerous letters in a small space has been to provide a "reduced keyboard" in which multiple letters, symbols, and/or digits, and the like, are assigned to any given key. For example, a touch-tone telephone includes a reduced keypad by providing twelve keys, of which ten have digits thereon, and of these ten keys eight have Latin letters assigned thereto. For instance, one of the keys includes the digit "2" as well as the letters "A", "B", and "C". Other known reduced keyboards have included other arrangements of keys, letters, symbols, digits, and the like.

In order to enable a user to make use of the multiple letters, digits, and the like on any given key, numerous keystroke interpretation systems have been provided. For instance, a "multi-tap" system allows a user to substantially unambiguously specify a particular character on a key by pressing the same key a number of times equivalent to the position of the desired character on the key. For example, on the aforementioned telephone key that includes the letters "ABC", and the user desires to specify the letter "C", the user will press the key three times. While such multi-tap systems have been generally effective for their intended purposes, they nevertheless can require a relatively large number of key inputs compared with the number of characters that ultimately are output.

Another exemplary keystroke interpretation system would include key chording, of which various types exist. For instance, a particular character can be entered by pressing two keys in succession or by pressing and holding a first key while pressing a second key. Still another exemplary keystroke interpretation system would be a "press-and-hold/press-and-release" interpretation function in which a given key provides a first result if the key is pressed and immediately released, and provides a second result if the key is pressed and held for a short period of time. While such systems have likewise been generally effective for their intended purposes, such systems also have their own unique drawbacks.

Another keystroke interpretation system that has been employed is a software-based text disambiguation function. In such a system, a user typically presses keys to which one or more characters have been assigned, actuating each key one time for each desired letter, and the disambiguation software attempts to predict the intended input. Numerous such systems have been proposed, and while many have been generally effective for their intended purposes, shortcomings still exist.

One such shortcoming arises when the handheld electronic device has a "keyboard" in which multiple currency symbols are assigned to a given key. For example, the dollar symbol ("$"), the euro symbol ("€"), and pound symbol ("£") might be assigned to a single key. When such a key is depressed, the handheld electronic device will typically prefer the dollar symbol as the user's first input selection as opposed to the euro or pound symbols. There are instances, however, when a user would prefer having the euro or pound symbol appear as the first selection rather than the dollar symbol.

A need therefore exists for an improved method and system for enabling input of currency symbols on a handheld electronic device. Accordingly, a solution that addresses, at least in part, the above and other shortcomings is desired.

BRIEF DESCRIPTION OF THE DRAWINGS

Features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE EMBODIMENTS

Figure 1:
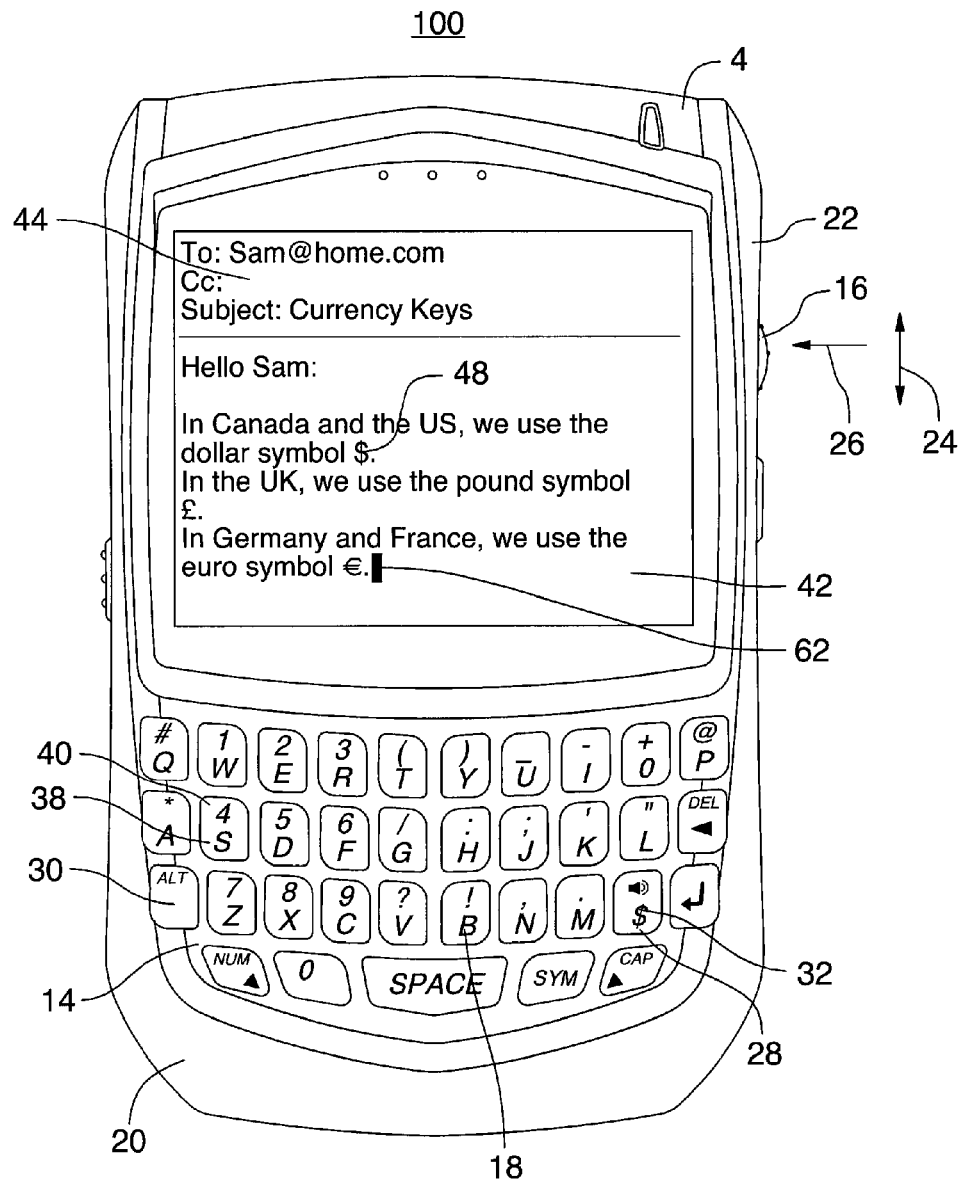
FIG. 1 is a top view of a handheld electronic device in accordance with an embodiment of the application.

In the following description, details are set forth to provide an understanding of the application. In some instances, certain software, circuits, structures and techniques have not been described or shown in detail in order not to obscure the application. Embodiments of the present application may be implemented in any computer programming language provided that the operating system of the data processing system provides the facilities that may support the requirements of the application. Any limitations presented would be a result of a particular type of operating system or computer programming language and would not be a limitation of the present application.

According to one embodiment, there is provided a method for selecting a symbol for presentation on a display of a handheld electronic device, comprising: receiving a signal from a key on the handheld electronic device actuated by a user to select a default symbol, the default symbol being one of a plurality of symbols available through actuation of the key; if the actuation of the key is an initial actuation of the key, presenting the plurality of symbols on the display and receiving a signal to select the default symbol from among the plurality of symbols; and, presenting the default symbol on the display.

In the above method, the symbol may be a currency symbol and the key may be a currency key. The symbol may be a parenthesis and the key may be a parenthesis key. The symbol may be a formatting option and the key may be a formatting option key. The presenting of the default symbol may further include inserting the default symbol into a text message presented on the display. The method may further include determining from a characteristic of the text message whether the default symbol is appropriate and if the default symbol is not appropriate selecting another symbol from among the plurality of symbols for inserting into the text message. The characteristic may be a language of the text message. The characteristic may be a use of one or more of the plurality of symbols in a message to which the text message is a reply. The characteristic may be a context of the text message. The method may further include determining from a characteristic of the handheld electronic device whether the default symbol is appropriate and if the default symbol is not appropriate selecting another symbol from among the plurality of symbols as the default symbol. The characteristic may be a location of the handheld electronic device. And, the method may further include presenting the plurality of symbols on the display and receiving a signal to select the default symbol from among the plurality of symbols.

In accordance with further aspects of the present application there are provided apparatus such as a handheld electronic device, methods for adapting the device, as well as articles of manufacture such as a computer readable medium having program instructions recorded therein for practising the method of the application.

Figure 2:
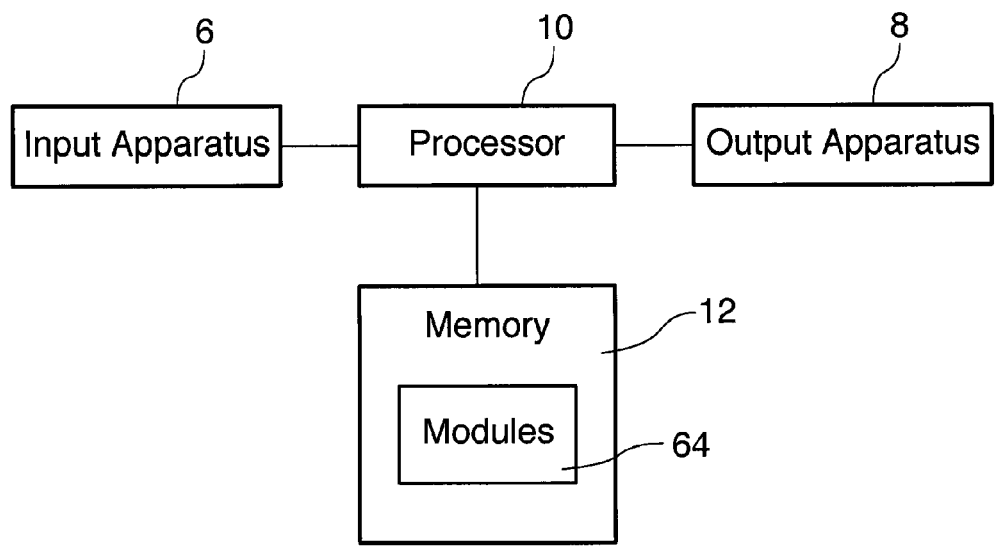
FIG. 2 is a block diagram illustrating the handheld electronic device of FIG. 1.

FIG. 1 is a top view of a handheld electronic device 100 in accordance with an embodiment of the application. And, FIG. 2 is a block diagram illustrating the handheld electronic device 100 of FIG. 1. The exemplary handheld electronic device 100 includes a housing 4 in which is disposed a processing system 200 that includes an input apparatus 6, an output apparatus 8, a processor 10, a memory 12, and one or more modules 64. The processor 10 may be, for instance, and without limitation, a microprocessor ("µP") and is responsive to inputs from the input apparatus 6 and provides output signals to the output apparatus 8. The processor 10 also interfaces with the memory 12.

The handheld electronic device 100 may be a two-way communication device having voice and/or advanced data communication capabilities, including the capability to communicate with other computer systems. Depending on the functionality provided by the device 100, it may be referred to as a data messaging device, a two-way pager, a cellular telephone with data messaging capabilities, a wireless Internet appliance, a data communication device (with or without telephony capabilities), a Wi-Fi device, or a wireless local area network ("WLAN") device.

As can be understood from FIGS. 1 and 2, the input apparatus 6 includes a keypad 14 and a thumbwheel 16. The keypad 14 is in the exemplary form of a QWERTY keyboard including a plurality of keys 18 that serve as input members. It is noted, however, that the keypad 14 may be of other configurations, such as an AZERTY keyboard, a reduced QWERTY keyboard, or other keyboard arrangement, whether presently known or unknown, and either reduced or not reduced.

The system architecture of the handheld electronic device 100 advantageously is organized to be operable independent of the specific layout of the keypad 14. Accordingly, the system architecture of the handheld electronic device 100 can be employed in conjunction with virtually any keypad layout without requiring any meaningful change in the system architecture. It is further noted that certain of the features set forth herein are usable on either or both of a reduced keyboard and a non-reduced keyboard.

The keys 18 are located on a front face 20 of the housing 4, and the thumbwheel 16 is located at a side 22 of the housing 4. In addition to the keys 18, the thumbwheel 16 can serve as another input member since the thumbwheel 16 is capable of being rotated, as indicated by arrow 24, and depressed generally toward the housing 4, as indicated by arrow 26. Rotation of the thumbwheel 16 provides selection inputs to the processor 10, while depression of the thumbwheel 16 provides another selection input to the processor 10.

Among the keys 18 of the keypad 14 is a currency key 28. The currently key 28 additionally and advantageously includes a graphic 32 disposed thereon. The graphic 32 may be that of the dollar symbol ("$"), As can further be seen in FIG. 1, many of the keys 18 include a one or more character, number, etc., disposed thereon. In the exemplary depiction of the keypad 14, many of the keys 18 include two characters, such as including a first character 38 and a second character 40 assigned thereto. Accordingly, when a key 18 having a first and a second character 38, 40 is depressed or actuated the input of that particular key can either be the first or second character 38, 40. In general, for a key 18 having first and second characters 38, 40 assigned thereto, the first (or lower) character 38 is entered by actuating the key 18 directly while the second (or upper) character 40 is entered by actuating the "ALT" key 30 followed by the key 18. Furthermore, punctuations may also be assigned to one or more keys 18 on the keypad 14. For example, the key 18 on which the letter "B" is disposed also includes the exclamation point ("!"). It should also be noted, however, that in other embodiments of the keypad 14 the actuation of the ALT key 30 prior to entering a linguistic element or punctuation key might not be necessary.

The output apparatus 8 includes a display 42 upon which can be provided an output 44. An exemplary output 44 is depicted on the display 42 in FIG. 1. The exemplary output 44 is a text message 44 that includes one or more characters or symbols 48. The text message 44 may be an email message and may be composed by a user using the various keys 18 on the keypad 14. The display 42 also includes a cursor 62 that depicts generally where the next output (e.g., character, symbol, etc.) will be displayed.

The memory 12 is depicted schematically in FIG. 2. The memory 12 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or non-volatile memory. As can be seen from FIG. 2, the memory 12 is in electronic communication with the processor 10. The memory 12 additionally includes a number of modules depicted generally with the numeral 64 for the processing of data. The modules 64 can be in any of a variety of forms such as, without limitation, software, firmware, and the like. As will be explained in greater detail below, the one or more modules 64 may be executed to perform the method of the present application as well as other functions that are utilized by the handheld electronic device 100. Additionally, the memory 12 can also store a variety of databases such as, without limitation, a language database.

Thus, the handheld electronic device 100 includes computer executable programmed instructions for directing the device 100 to implement the embodiments of the present application. The programmed instructions may be embodied in one or more modules 64 resident in the memory 12 of the device 100. Alternatively, the programmed instructions may be embodied on a computer readable medium (such as a CD disk or floppy disk) which may be used for transporting the programmed instructions to the memory 12 of the device 100. Alternatively, the programmed instructions may be embedded in a computer-readable signal or signal-bearing medium that is uploaded to a network by a vendor or supplier of the programmed instructions, and this signal or signal-bearing medium may be downloaded through an interface to the device 100 from the network by end users or potential buyers.

In operation, when a user is composing a text message 44 (or note, memo, task, document, spreadsheet, text entry, etc.) using the handheld electronic device 100 and wishes to enter a currency symbol (e.g., the dollar symbol "$") 48 into the text message 44, the user would press the currency key 28. If the currency key 28 has been used before, a default currency symbol (e.g., "$") is then inserted into the text message 44. The currency key 28 may not have been used before if the device 100 is a new or newly activated device 100.

Figure 3:
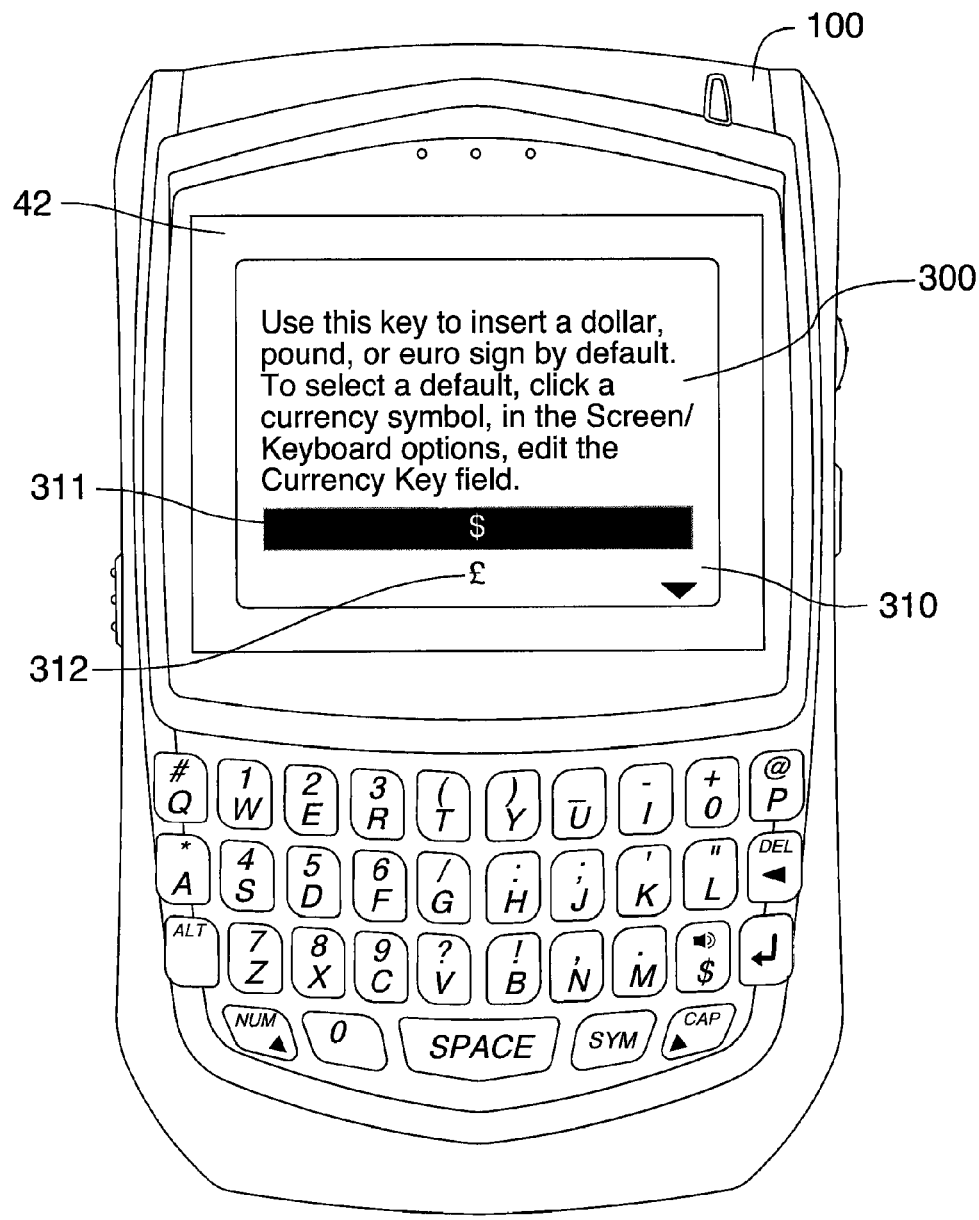
FIG. 3 is a screen capture illustrating an initial default currency symbol dialog box in accordance with an embodiment of the invention.

If the currency key 28 has not been used before, the user is provided with the opportunity to set the default currency symbol. To this end, upon first pressing the currency key 28, an initial default currency symbol dialog box 300 is presented to the user on the display 42 as shown in FIG. 3. The initial default currency symbol dialog box 300 includes a list 310 of currency symbols 311, 312 from which the user may select a default currency symbol. The user may choose a default currency symbol (e.g., the dollar symbol "$" 311) from the list 310 by scrolling through the list using the thumbwheel 16 to hi-light the desired symbol 311 which may then be selected by clicking the thumbwheel 16. After the default currency symbol (e.g., "$" 311) has been thus set, each time the currency key 28 is pressed, the default currency symbol (e.g., "$" 311) will be inserted into the test message 44. The default currency symbol setting will be saved in the memory 12, 64 of the device 100.

Figure 4:
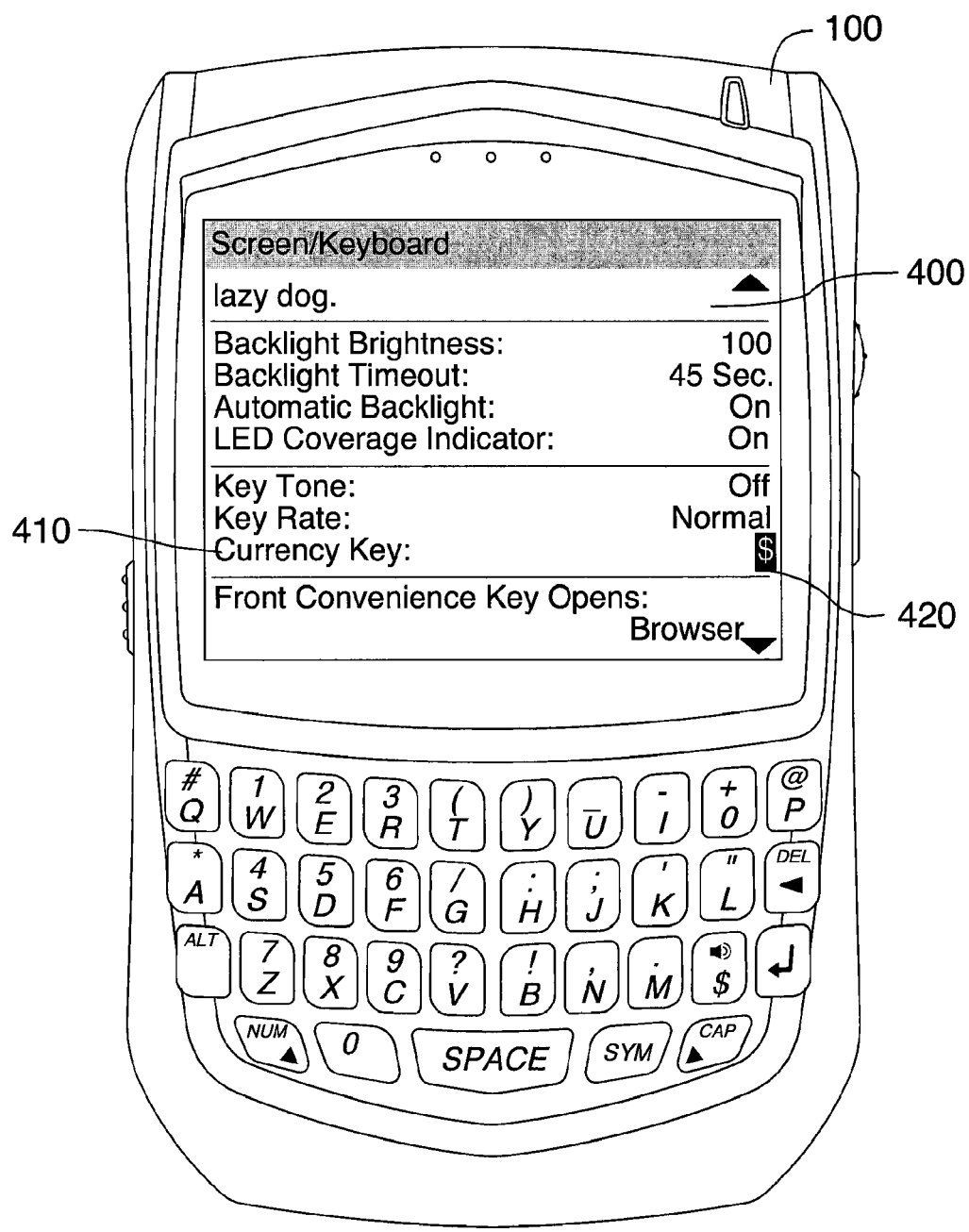
FIG. 4 is a screen capture illustrating a settings menu in accordance with an embodiment of the invention.

Subsequently, if the user wants to change the default currency symbol from, for example, the dollar symbol "$" 311 to the pound symbol "£" 312, the user may do so through a settings menu 400 which the user may choose to have presented on the display 42. The settings menu 400 is shown in FIG. 4. The settings menu 400 has a currency key menu item 410 and a currency key default symbol setting indication 420. In FIG. 4, the currency key default symbol setting indication 420 indicates that the currency key default symbol is currently the dollar symbol ("$").

Figure 5:
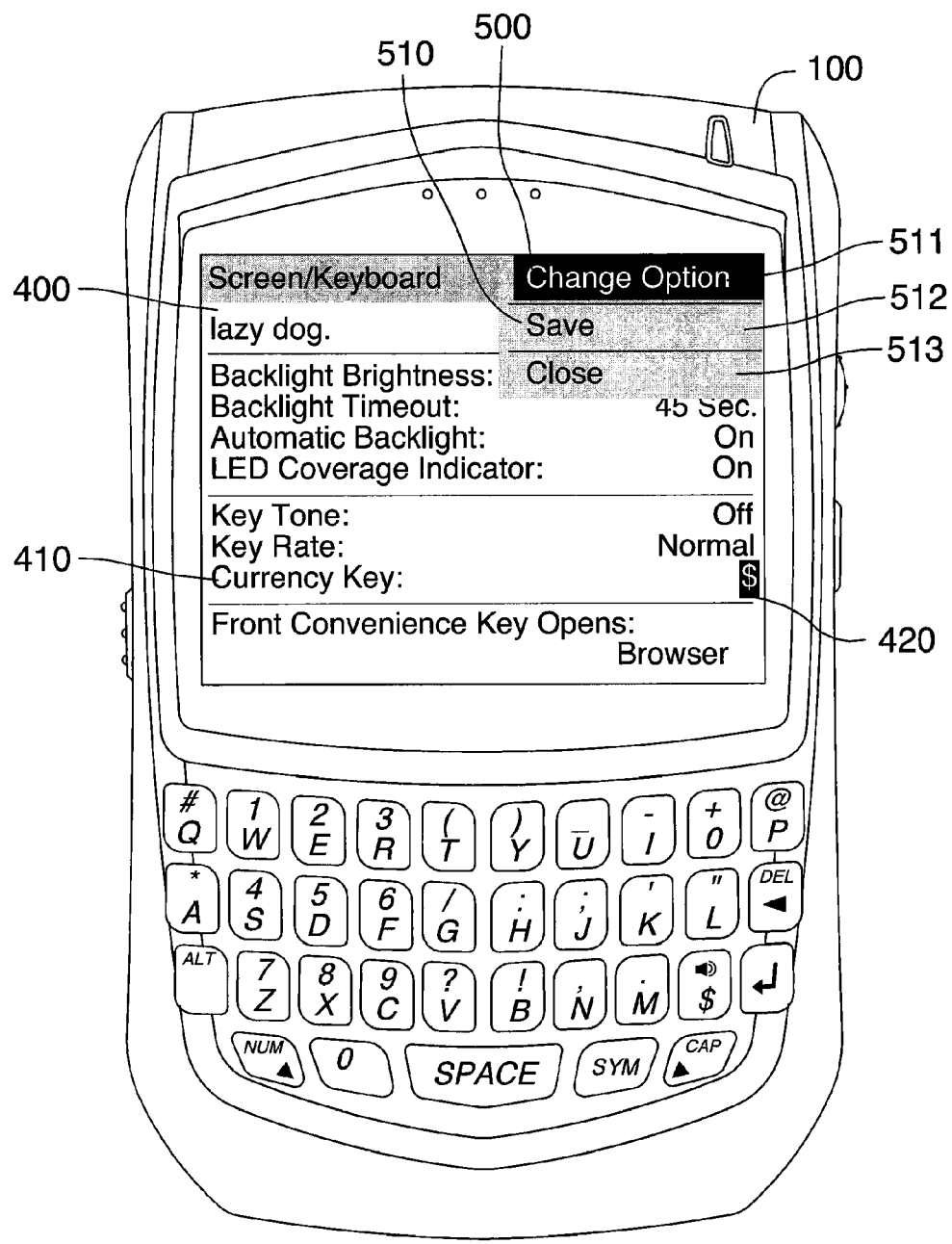
FIG. 5 is a screen capture illustrating a change option dialog box in accordance with an embodiment of the invention.

By selecting the currency key default symbol setting indication 420, the user is presented with a change option dialog box 500 as shown in FIG. 5. The change option dialog box 500 includes a list 510 of functions 511, 512, 513 for changing default settings. The list of functions 510 may include a change option function 511 for changing a default setting, a save function 512 for saving changes to one or more default settings, and a close function 513 for exiting from the change option dialog box 500.

Figure 6:
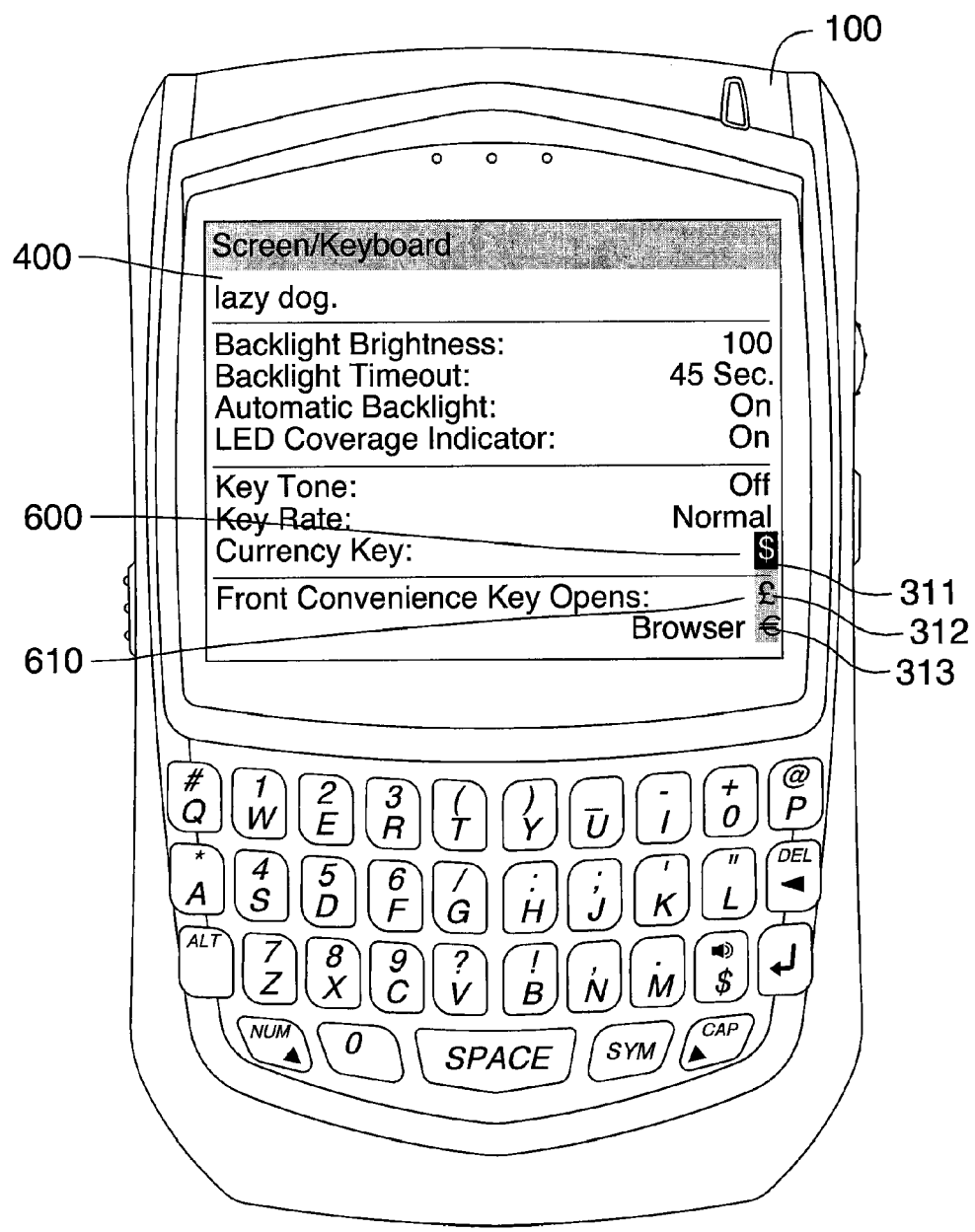
FIG. 6 is a screen capture illustrating default currency symbol dialog box in accordance with an embodiment of the invention.

Upon selecting the change option function 511 from the change option dialog box 500, a default currency symbol dialog box 600.is presented to the user on the display 42 as shown in FIG. 6. Similar to the initial default currency symbol dialog box 300, the default currency symbol dialog box 600 includes a list 610 of currency symbols 311, 312, 313 from which the user may select a default currency symbol.

Figure 7:
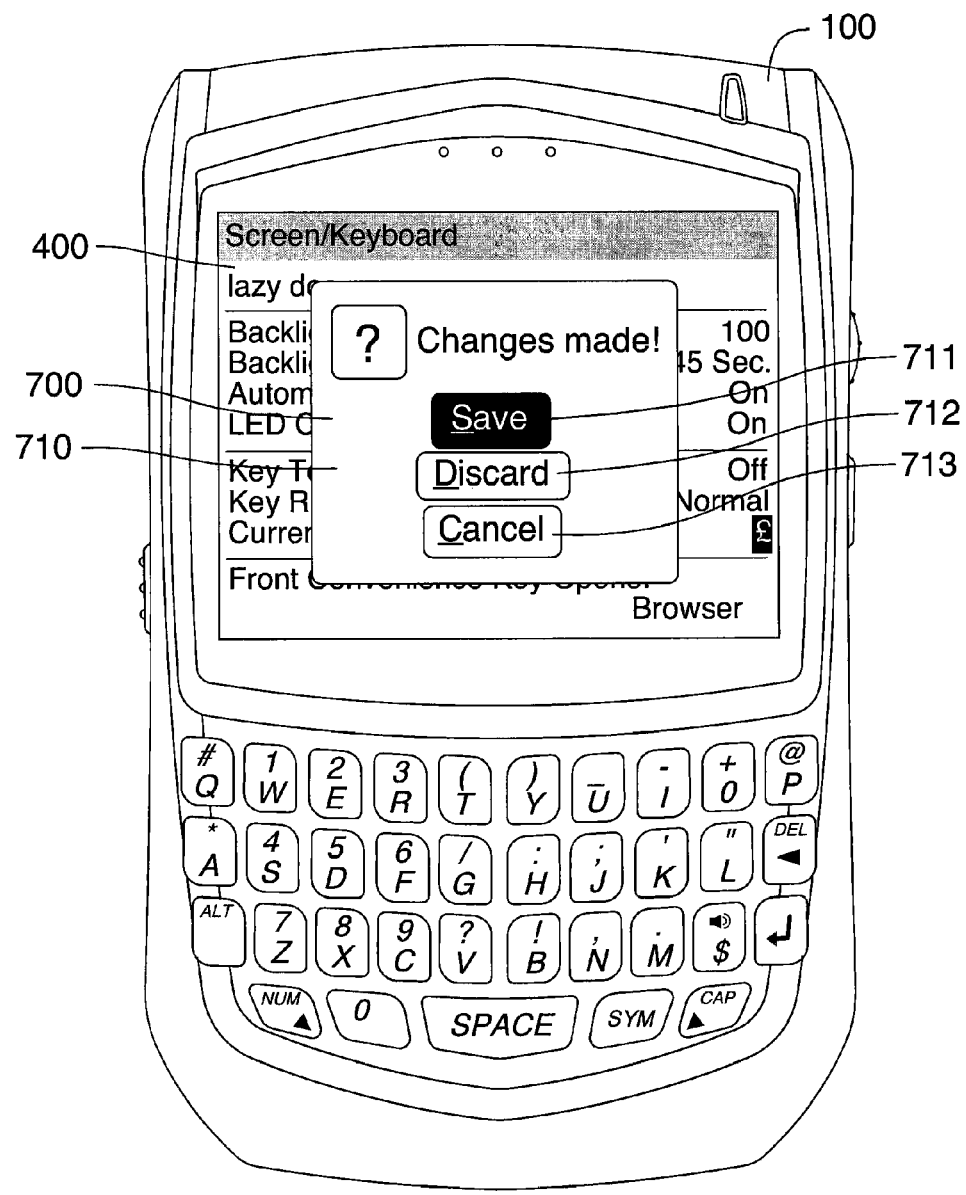
FIG. 7 is a screen capture illustrating a changes made dialog box in accordance with an embodiment of the invention; and, FIG. 8 is a flow chart illustrating operations of modules within the memory of a handheld electronic device for selecting a symbol for presentation on a display of the handheld electronic device, in accordance with an embodiment of the application.

If the user selects a new default currency symbol (e.g., the pound symbol "£" 312), upon attempting to exit the settings menu 400 the user is prompted to save or discard the change to the default currency symbol setting 420 through a changes made dialog box 700 as shown in FIG. 7. The changes made dialog box 700 includes a list 710 of functions 711, 712, 713 for confirming default setting changes. The list of functions 710 may include a save function 711 for saving changes to one or more default settings, a discard function 712 for abandoning changes to one or more default settings, and a cancel function 713 for returning to the settings menu 400.

According to one embodiment, the default currency symbol (e.g., "$" 311) may be preset by the manufacturer or supplier of the handheld electronic device 100.

According to one embodiment, upon pressing the currency key 28 while composing a text message 44, a currency symbol dialog box similar to the default currency symbol dialog box 600 of FIG. 6 may be presented on the display 42 allowing the user to select a currency symbol (e.g., "$" 311) from among the plurality of symbols (e.g., "$" 311, "£" 312, "€" 313) included in the dialog box 600. The current default currency symbol (e.g., "$" 311) may be highlighted in the dialog box 600. Upon selecting a desired currency symbol (e.g., "$" 311) from the dialog box 600, that symbol will be inserted into the text message 44.

According to one embodiment, if after inserting the default symbol (e.g., "$" 311) into a text message 44 and pressing a backspace key (not shown) on the keypad 14, a currency symbol dialog box similar to the default currency symbol dialog box 600 may be presented on the display 42 allowing the user to select another currency symbol (e.g., "£" 312) from among the plurality of symbols (e.g., "$" 311, "£" 312, ""€"" 313) for this particular entry. The current currency symbol default setting 420 (e.g., "$" 311) would not be changed by this operation.

Thus, according to the present application there is provided a currency key 28 on the keypad 14 of a handheld electronic device 100. This key 28 allows for the entry of dollar ("$"), euro (" ("€"),"), pound ("£"), yen ("¥"), etc., symbols. The user is able to set the default currency symbol via a currency key option 410 in "Screen/Keyboard" options menu 400. If a default currency symbol is not set, the user is presented with a choice box or dialog 300 for the first time the currency key 28 is pressed and the symbol selected there will be set as the default symbol.

According to one embodiment, prior to inserting the default symbol (e.g., "$" 311) into a text message 44 presented on the display 42, modules 64 within the memory 12 of a handheld electronic device 100 may determine from a characteristic of the text message 44 whether the default symbol (e.g., "$" 311) is appropriate for inserting in the text message 44. If the default symbol (e.g., "$" 311) is not appropriate, then the modules 64 may select another symbol (e.g., "£"

312) from among the plurality of symbols (e.g., "$" 311, "£" 312, ""€"" 313) and this other symbol (e.g., "£" 312) may be inserted into the text message 44 (and/or set as the default symbol). The characteristic may be the language (e.g., English, French, German) in which the text message 44 is composed. For example, if the composition language was German or French, the euro symbol ""€"" may be inserted into the text message 44 rather than the dollar symbol "$" as the euro is the denomination of currency used in Germany and France. Alternatively, the characteristic may be a use of one or more of the plurality of symbols (e.g., "$" 311, "£" 312, ""€"" 313) in an original message to which the text message 44 is a reply. For example, the original message may discuss a transaction involving an amount denominated in pounds "£". As such, rather than inserting the dollar symbol "$" in a response 44 to the original message, the pound symbol "£" may be inserted. Alternatively, the characteristic may relate to the context or content of text message 44 into which the default symbol (e.g., "$" 311) is to be inserted. For example, if a sentence in the text message 44 includes the words "Germany" and "France", then the euro symbol ""€"" may be inserted into the text message 44 rather than the dollar symbol "$".

According to another embodiment, prior to inserting the default symbol (e.g., "$" 311) into a text message 44 presented on the display 42, modules 64 within the memory 12 of a handheld electronic device 100 may determine from a characteristic of the handheld electronic device 100 whether the default symbol (e.g., "$" 311) is appropriate for inserting in the text message 44. If the default symbol (e.g., "$" 311) is not appropriate, then the modules 64 may select another symbol (e.g., "£" 312) from among the plurality of symbols (e.g., "$" 311, "£" 312, ""€"" 313) and this other symbol (e.g., "£" 312) may be inserted into the text message 44 (and/or set as the default symbol). The characteristic may be a location (e.g., Canada, the United States, England, France, Germany) of the handheld electronic device 100. This location may be determined from a geographical positioning system ("GPS") receiver optionally included in the handheld electronic device 100. Alternatively, the location may be determined from a wireless or wired network in which the handheld electronic device 100 may be currently operating.

According to one embodiment, ordering of or highlighting within the list 310, 610 of currency symbols 311, 312, 313 presented in the initial default currency symbol dialog box 300 and in the default currency symbol dialog box 600 is based on a characteristic of the handheld electronic device 100 such as the device's location. For example, if the device 100 were located in England, the list of currency symbols 310, 610 may begin with the pound "£" symbol 312 or that symbol may be highlighted within the list. On the other hand, if the device 100 were located in the United States, the list of currency symbols 310, 610 may begin with the dollar "$" symbol 311 or that symbol may be highlighted within the list. According to one embodiment, the remaining symbols in the list 310, 610 may be ordered based on the relative size (e.g., land area, gross domestic product, trade balance, etc.) of the country or region to which they pertain. According to one embodiment, the remaining symbols in the list 310, 610 may be ordered based on the relative separation (e.g., distance in miles, economic development, political affiliation, etc.) that the country or region to which they pertain is from the country or region to which the first symbol in the list pertains.

According to one embodiment, rather than currency symbols and a currency key, the method of the present application may be applied to parenthesis symbols (e.g., ( ), [ ], { }) and a parenthesis key (or keys). According to another embodiment, the method of the present may be applied to formatting options (e.g., underline, bold, italic) and a formatting option key (or keys).

Figure 8:
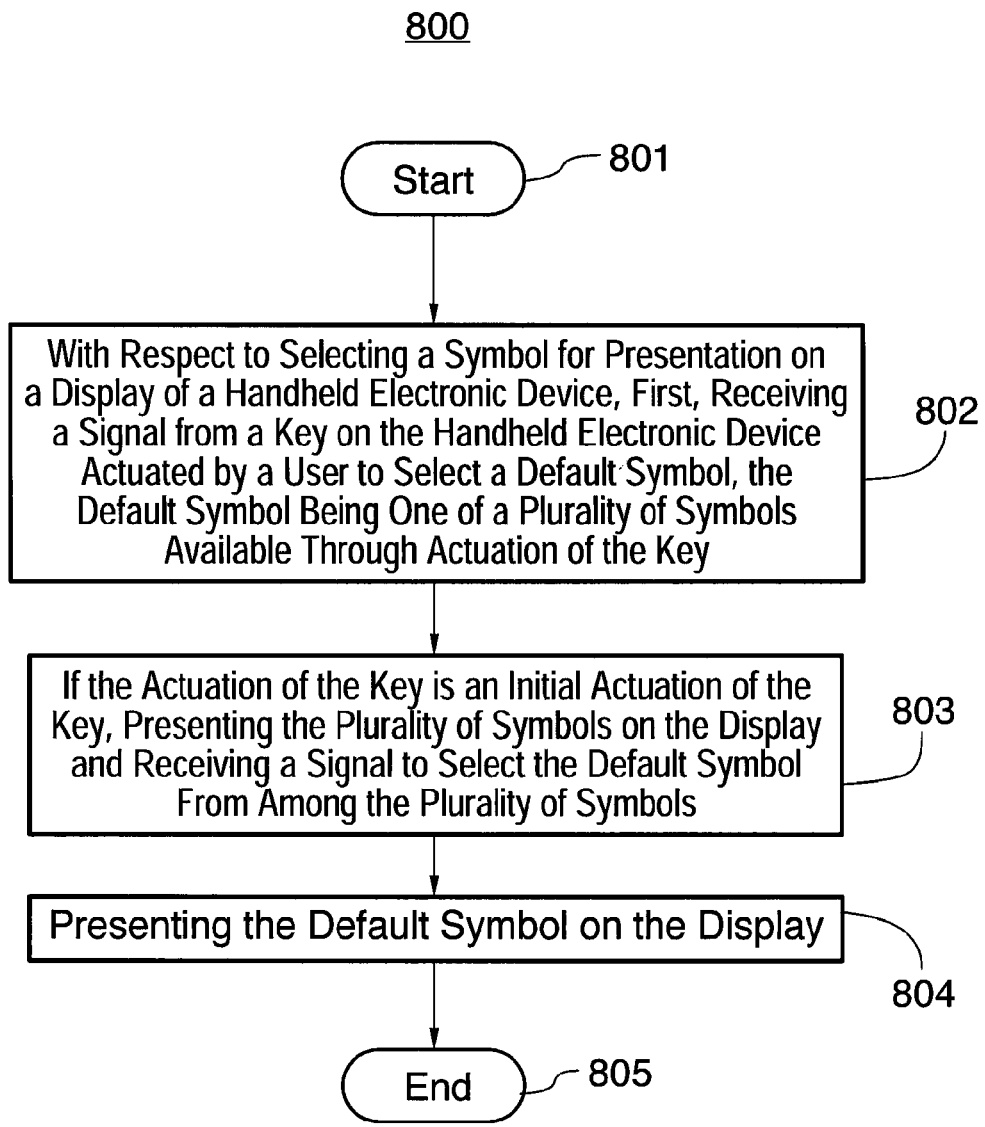

The above described method may be summarized with the aid of a flowchart. FIG. 8 is a flow chart illustrating operations 800 of modules 64 within the memory 12 of a handheld electronic device 100 for selecting a symbol for presentation on a display 42 of the handheld electronic device 100, in accordance with an embodiment of the application.

At step 801, the operations 800 start.

At step 802, a signal is received from a key (e.g., 28) on the handheld electronic device 100 actuated by a user to select a default symbol (e.g., "$" 311), the default symbol being one of a plurality of symbols (e.g., "$" 311, "£" 312, ""€"" 313) available through actuation of the key 28.

At step 803, if the actuation of the key 28 is an initial actuation of the key, the plurality of symbols (e.g., "$" 311, "£" 312, ""€"" 313) is presented 300, 310 on the display 42 and a signal is received to select the default symbol (e.g., "$" 311) from among the plurality of symbols (e.g., "$" 311, "£" 312, ""€"" 313).

At step 804, the default symbol (e.g., "$" 311) is presented on the display 42.

At step 805, the operations 800 end.

In the above method, the symbol may be a currency symbol (e.g., "$" 311) and the key may be a currency key 28. The symbol may be a parenthesis (e.g., ( ), [ ], { }) and the key may be a parenthesis key. The symbol may be a formatting option (e.g., underline, bold, italic) and the key may be a formatting option key. The presenting of the default symbol may further include inserting the default symbol (e.g., 311) into a text message 44 presented on the display 42. The method may further include determining from a characteristic of the text message 44 whether the default symbol (e.g., "$" 311) is appropriate and if the default symbol (e.g., "$" 311) is not appropriate selecting another symbol (e.g., "£" 312) from among the plurality of symbols (e.g., "$" 311, "£" 312, ""€"" 313) for inserting into the text message 44. The characteristic may be a language (e.g., English, French, German) of the text message 44. The characteristic may be a use of one or more of the plurality of symbols (e.g., "$" 311, "£" 312, ""€"" 313) in a message to which the text message 44 is a reply. The characteristic may be a context of the text message 44. The method may further include determining from a characteristic of the handheld electronic device 100 whether the default symbol (e.g., "$" 311) is appropriate and if the default symbol (e.g., "$" 311) is not appropriate selecting another symbol (e.g., "£" 312) from among the plurality of symbols (e.g., "$" 311, "£" 312, ""€"" 313) as the default symbol. The characteristic may be a location (e.g., Canada, the United States, England, France, Germany) of the handheld electronic device 100. And, the method may further include presenting (e.g., 600) the plurality of symbols (e.g., "$" 311, "£" 312, ""€"" 313) on the display and 42 receiving a signal to select the default symbol (e.g., "$" 311) from among the plurality of symbols.

In addition to the currencies and currency symbols (e.g., $, £, €, ¥) mentioned above, the method is also applicable to other currencies and currency symbols (e.g., Dinar, RMB, Rubee, etc.).

The above described method is generally performed by a handheld electronic device 100. However, according to an alternate embodiment, the method can be performed by any data processing system including, for example, a personal computer and a laptop computer.

While embodiments of this application are primarily discussed as a method, a person of ordinary skill in the art will understand that the apparatus discussed above with reference to a handheld electronic device 100, may be programmed to enable the practice of the method of these embodiments. Moreover, an article of manufacture for use with a handheld electronic device 100, such as a pre-recorded storage device or other similar computer readable medium including program instructions recorded thereon, may direct the device 100 to facilitate the practice of the method of these embodiments. It is understood that such apparatus and articles of manufacture also come within the scope of the application.

The embodiments of the application described above are intended to be exemplary only. Those skilled in this art will understand that various modifications of detail may be made to these embodiments, all of which come within the scope of the application.

What is claimed is:

1. A method for selecting a symbol for presentation on a display of a handheld electronic device, comprising:
   receiving a first signal from a key on the handheld electronic device actuated by a user to select a default symbol to present on the display, the default symbol being one of a plurality of symbols available through actuation of the key and being assigned to the key upon an initial actuation of the key;
   if the actuation of the key is the initial actuation of the key, presenting the plurality of symbols on the display and receiving a second signal to select the default symbol from among the plurality of symbols and assign the default symbol to the key; and,
   presenting the default symbol on the display.

2. The method of claim 1 wherein the symbol is a currency symbol and the key is a currency key.

3. The method of claim 1 wherein the symbol is a parenthesis and the key is a parenthesis key.

4. The method of claim 1 wherein the symbol is a formatting option and the key is a formatting option key.

5. The method of claim 1 wherein the presenting of the default symbol further comprises inserting the default symbol into a text message presented on the display.

6. The method of claim 5 and further comprising determining from a characteristic of the text message whether the default symbol is appropriate and if the default symbol is not appropriate selecting another symbol from among the plurality of symbols for inserting into the text message.

7. The method of claim 6 wherein the characteristic is a language of the text message.

8. The method of claim 6 wherein the characteristic is a use of one or more of the plurality of symbols in a message to which the text message is a reply.

9. The method of claim 1 and further comprising determining from a characteristic of the handheld electronic device whether the default symbol is appropriate and if the default symbol is not appropriate selecting another symbol from among the plurality of symbols as the default symbol.

10. The method of claim 9 wherein the characteristic is a location of the handheld electronic device.

11. The method of claim 6 wherein the characteristic is a context of the text message.

12. The method of claim 1 and further comprising presenting the plurality of symbols on the display and receiving a third signal to select the default symbol from among the plurality of symbols.

13. A system for selecting a symbol for presentation on a display of a handheld electronic device, the system comprising:
   a processor coupled to the display and to a key on a keypad of the handheld electronic device; and,
   firmware modules or the like executed by the processor, the firmware modules including:
      a firmware module for receiving a first signal from the key actuated by a user to select a default symbol to present on the display, the default symbol being one of a plurality of symbols available through actuation of the key and being assigned to the key upon an initial actuation of the key;
      a firmware module for, if the actuation of the key is the initial actuation of the key, presenting the plurality of symbols on the display and receiving a second signal to select the default symbol from among the plurality of symbols and assign the default symbol to the key; and,
      a firmware module for presenting the default symbol on the display.

14. The system of claim 13 wherein the symbol is a currency symbol and the key is a currency key.

15. The system of claim 13 wherein the symbol is a parenthesis and the key is a parenthesis key.

16. The system of claim 13 wherein the symbol is a formatting option and the key is a formatting option key.

17. The system of claim 13 wherein the firmware module for presenting of the default symbol further comprises a firmware module for inserting the default symbol into a text message presented on the display.

18. The system of claim 17 and further comprising a firmware module for determining from a characteristic of the text message whether the default symbol is appropriate and if the default symbol is not appropriate selecting another symbol from among the plurality of symbols for inserting into the text message.

19. The system of claim 18 wherein the characteristic is a language of the text message.

20. The system of claim 18 wherein the characteristic is a use of one or more of the plurality of symbols in a message to which the text message is a reply.

21. The system of claim 13 and further comprising a firmware module for determining from a characteristic of the handheld electronic device whether the default symbol is appropriate and if the default symbol is not appropriate selecting another symbol from among the plurality of symbols as the default symbol.

22. The system of claim 21 wherein the characteristic is a location of the handheld electronic device.

23. The system of claim 18 wherein the characteristic is a context of the text message.

24. The system of claim 13 and further comprising a firmware module for presenting the plurality of symbols on the display and receiving a third signal to select the default symbol from among the plurality of symbols.

* * * * *